United States Patent
Walmsley (10) Patent No.: US 7,484,411 B2
(45) Date of Patent: Feb. 3, 2009

(54) THREE PHASE CAPACITANCE-BASED SENSING AND ACTUATION

(75) Inventor: Robert G. Walmsley, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 59 days.

(21) Appl. No.: 11/668,951

(22) Filed: Jan. 30, 2007

(65) Prior Publication Data

US 2008/0178674 A1 Jul. 31, 2008

(51) Int. Cl.
*G01P 15/125* (2006.01)
(52) U.S. Cl. .................................. 73/514.32
(58) Field of Classification Search ............. 73/514.32, 73/514.16, 514.29, 514.36, 514.38, 514.01, 73/504.12, 504.14
See application file for complete search history.

(56) References Cited

U.S. PATENT DOCUMENTS

| | | | | |
|---|---|---|---|---|
| 5,719,336 A | * | 2/1998 | Ando et al. ............... | 73/514.32 |
| 5,894,091 A | * | 4/1999 | Kubota ..................... | 73/504.12 |
| 6,041,653 A | * | 3/2000 | Ichikawa et al. ......... | 73/514.32 |
| 6,223,598 B1 | * | 5/2001 | Judy ........................ | 73/514.32 |
| 6,591,678 B2 | * | 7/2003 | Sakai ....................... | 73/514.36 |
| 7,119,550 B2 | * | 10/2006 | Kitano et al. .............. | 324/658 |
| 7,343,801 B2 | * | 3/2008 | Kapser et al. ............ | 73/514.32 |

* cited by examiner

*Primary Examiner*—Helen C. Kwok (57) ABSTRACT

Various systems and methods for sensing are provided. In one embodiment, a sensing system is provided that includes a first electrode array disposed on a proof mass, and a second electrode array disposed on a planar surface of a support structure. The proof mass is attached to the support structure via a compliant coupling such that the first electrode array is positioned substantially parallel to and faces the second electrode array, where the proof mass is capable of displacement relative to the support structure. The displacement of the proof mass is in a direction substantially parallel to the second electrode array. The first electrode array comprises a plurality of first patterns of electrodes, the first patterns being interdigitated, and each of the first patterns comprises at least two first electrodes. The second electrode array comprises a plurality of second patterns of electrodes, the second patterns being interdigitated. Each of the second patterns comprising at least three second electrodes, where corresponding ones of the second electrodes in the second patterns are coupled in common.

22 Claims, 7 Drawing Sheets

THREE PHASE CAPACITANCE-BASED SENSING AND ACTUATION

BACKGROUND

The sensing of position and acceleration using capacitive Micro Electro-Mechanical Systems (MEMS) can lack sensitivity and accuracy due to unwanted movement of compliant components and due to the limited range of motion of such components. In addition, it can be difficult to track the actual displacement of compliant components due to the nature of the output signal associated with variable capacitances.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
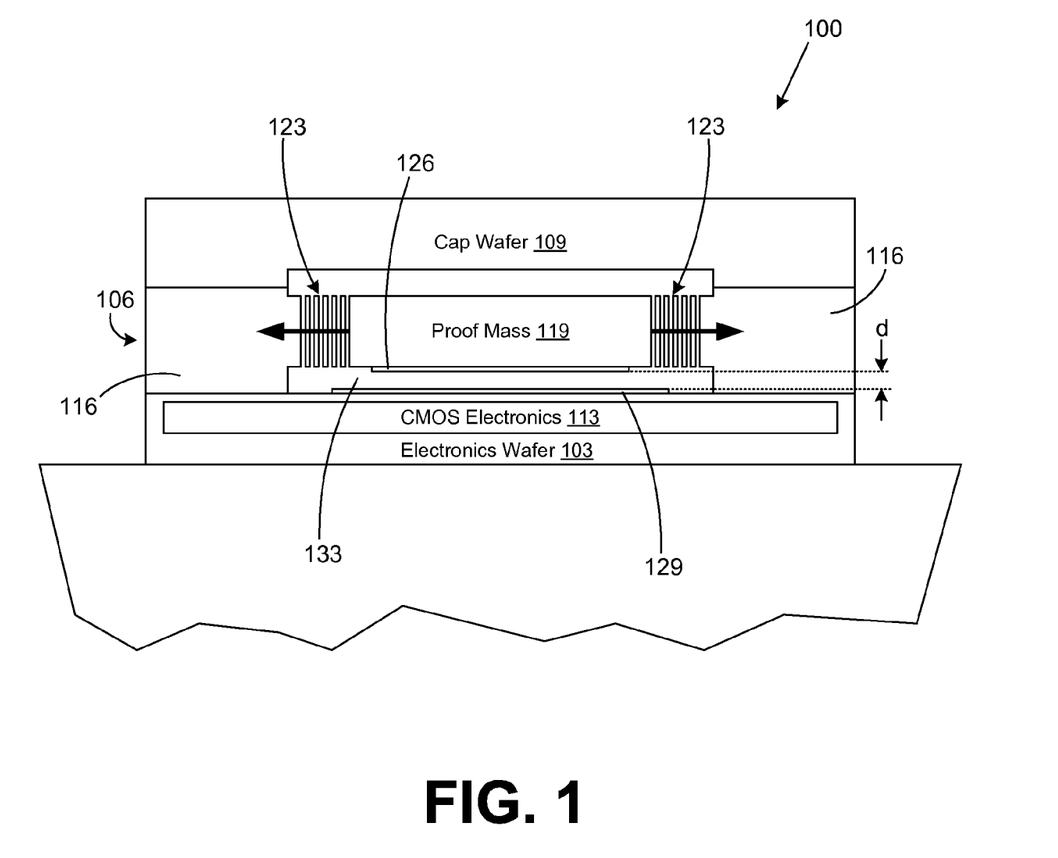
FIG. 1 is a diagram of a sensor according to an embodiment of the present invention.

With reference to FIG. 1, shown is a sensor 100 according to an embodiment of the present invention. The sensor 100 may be employed, for example, to detect acceleration, as will be described. The sensor 100 includes three layers, or "wafers." In particular, the sensor 100 includes an electronics wafer 103, a proof mass wafer 106, and a cap wafer 109. Within the electronics wafer 100 is CMOS electronics 113 that may be electrically coupled to various electrical components in the proof mass wafer 106 and the cap wafer 109. Also, the CMOS electronics 113 may provide output ports for coupling to electronic components external to the sensor 100 as can be appreciated. For certain applications, heat generated in the CMOS electronics 113 may be unacceptable in which case they may be located in a separate but proximal electronics die, etc.

The proof mass wafer 106 includes the support 116 that is mechanically coupled to a proof mass 119. Although the cross-sectional view of the sensor 100 is shown, according to one embodiment, the support 116 as a portion of the proof mass wafer 106 surrounds the proof mass 119. Consequently, in one embodiment, the electronics wafer 103, the support 116, and the cap wafer 109 form a pocket within which the proof mass 119 is suspended.

Together, the electronics wafer 103, the support 116, and the cap wafer 109 provide a support structure to which the proof mass 119 is attached via a compliant coupling according to various embodiments of the present invention. In this respect, the compliant coupling may comprise high aspect ratio flexural suspension elements 123. The high aspect ratio flexural suspension elements 123 may be those that are discussed, for example, in U.S. Pat. No. 6,882,019 entitled "Moveable Micro-Electromechanical Device" issued on Apr. 19, 2005, which is incorporated herein by reference in its entirety.

The sensor 100 further includes a first electrode array 126 that is disposed on the proof mass 119. In one embodiment, the first electrode array 126 is located on a surface of the proof mass 119 that is opposite the upper surface of the electronics wafer 103. The surface of the proof mass 119 upon which the first electrode array 126 is disposed is a substantially flat surface as can be appreciated.

A second electrode array 129 is disposed on a surface of the electronics wafer 103 facing opposite the first electrode array 126 disposed on the proof mass 119. Due to the manner in which the proof mass 126 is suspended over the electronics wafer 103, a substantially uniform gap 133 is formed between the first electrode array 126 and the second electrode array 129. The size of the gap 133 is denoted by distance d. The distance d may comprise, for example, anywhere from 1 to 3 micrometers, or it may be any other distance as is deemed appropriate.

The proof mass 119 is suspended above the electronics wafer 103 in such a manner that the first electrode array 126 and the second electrode array 129 substantially fall into planes that are parallel to each other, such that the gap 133 is substantially uniform throughout the entire overlap between the first and second electrode arrays 126 and 129. Alternatively, the electrode arrays 126, 129 may be placed on other surfaces or structures of the electronics wafer 103 or the proof mass 119, as may be deemed appropriate.

The high aspect ratio flexural suspension elements 123 offer a degree of compliance that allows the proof mass 119 to move relative to the support structure of the sensor 100. Due to the design of the flexural suspension elements 123, the displacement of the proof mass 119 from a rest position is substantially restricted to a direction that is substantially parallel to the second electrode array 129, which is disposed on the upper surface of the electronics wafer 103. The flexural suspension elements 123 are configured to allow for a predefined amount of movement of the proof mass 119 in a direction parallel to the second electrode array 129 such that the gap 133 remains substantially uniform throughout the entire motion to the extent possible. The design of the flexural suspension elements 123 provides for a minimum amount of motion of the proof mass 119 in a direction orthogonal to the second electrode array 129, while allowing a desired amount of motion in the direction parallel to the second electrode array 129.

Next, a brief discussion of the operation of the sensor 100 in sensing acceleration, for example, is provided. In particular, the sensor 100 is affixed to a structure or vehicle that experiences acceleration that one wishes to quantify. The sensor 100 is affixed to the structure or device such that the direction of the acceleration is in line with the direction of the permitted movement of the proof mass 119 as provided by the flexural suspension elements 123 as discussed above. Once the structure or vehicle experiences acceleration, the proof mass 119 will move as described above. Due to the fact that the first electrode array 126 and the second electrode array 129 are disposed on the proof mass 119 and the electronics wafer 103, then one or more capacitances between the first and second electrode arrays 126 and 129 will vary with the shifting of the arrays with respect to each other.

The CMOS electronics 113 and/or external electronics may be employed to detect or sense the degree of the change in the capacitances between the electrode arrays 126 and 129. Based upon the change in the capacitances, such circuitry can generate appropriate signals that are proportional to the acceleration experienced by the sensor 100. Alternatively, a closed loop circuit may be employed to maintain the proof mass 119 at a predefined location during acceleration. Such a circuit comprises a closed loop that applies actuation signals to cause the proof mass 119 to stay at the predefined location based upon position feedback from the first and second electrode arrays 126 and 129 as will be described.

While motion of the proof mass 119 is substantially restricted within a plane that is substantially parallel to the second electrode array 129, given that the flexural suspension elements 123 are compliant in nature, then it is possible that the proof mass 119 might experience displacement relative to the second electrode array 129 in a direction orthogonal to the second electrode array 129. Stated another way, unwanted movement of the proof mass 119 may occur resulting in an undesirable change in the gap 133. According to various embodiments of the present invention, normalization may be employed to cancel out any changes in the desired cross-capacitances between the first and second electrode arrays 126 and 129 due to a change in the gap 133 as will be described.

Figure 2:
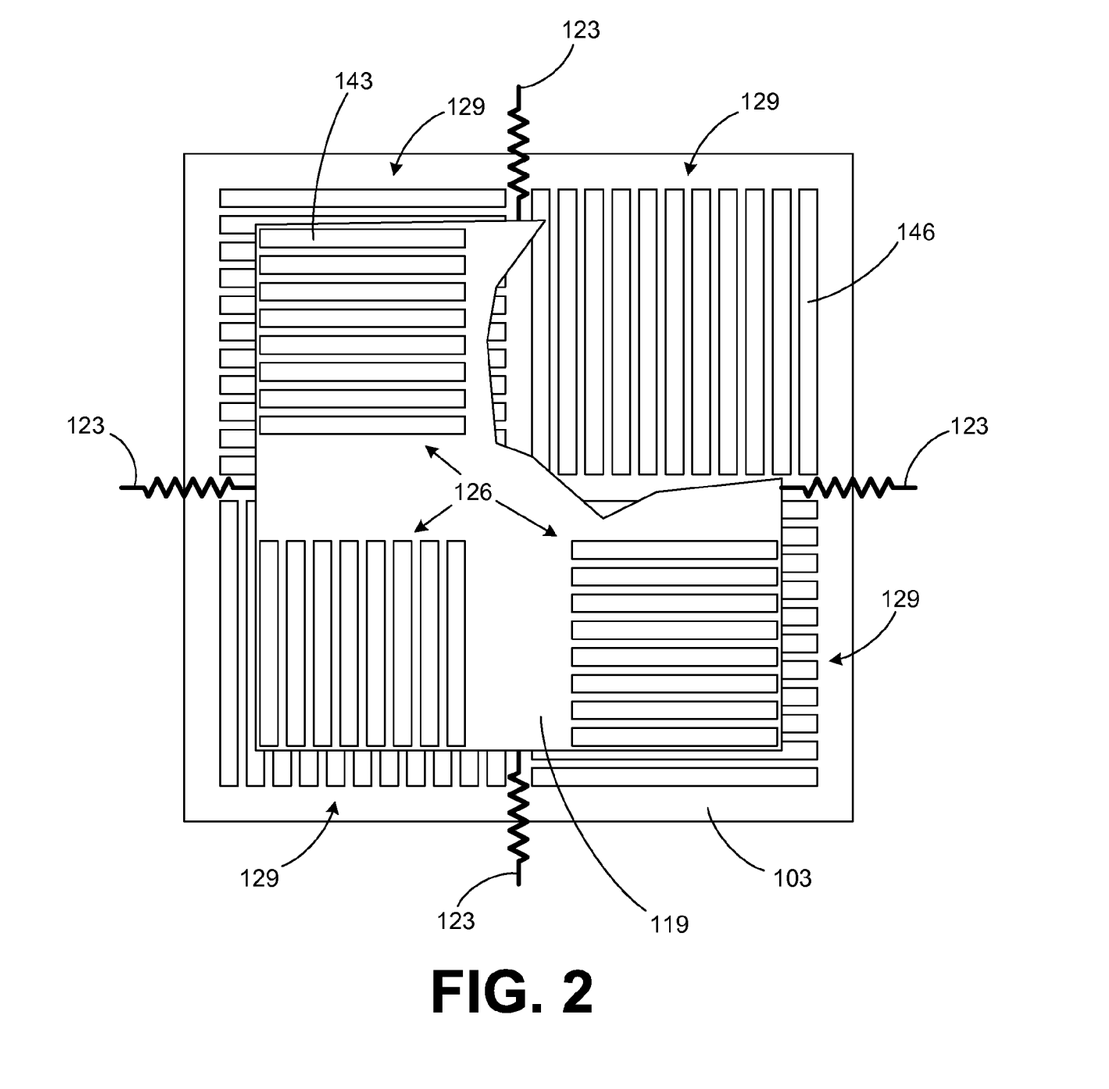
FIG. 2 is a drawing of electrode arrays employed in the sensor of FIG. 1 according to an embodiment of the present invention.

Next, with reference to FIG. 2, shown are views of the respective first and second electrode arrays 126 and 129 according to an embodiment of the present invention. As shown, there are actually multiple first electrode arrays 126 and multiple second electrode arrays 129. For example, in the configuration shown, there may be four pairs of first and second electrode arrays 126 and 129. Given that the first and second electrode arrays 126 and 129 are oriented as shown in FIG. 2, the movement of the proof mass 119 in two dimensions within a plane that is parallel to the second electrode array 129 may be sensed. Accordingly, in one embodiment, the flexural suspension elements 123 are configured to allow movement of the proof mass 119 in two dimensions. Alternatively, the flexural suspension elements may be configured to allow movement in a single dimension, where the first and second electrode arrays 129 and 129 are situated in a single orientation to sense such single dimensional movement.

Each individual electrode array comprises a plurality of electrodes. In particular, the first electrode arrays 126 are each made up of a plurality of first electrodes 143 and the second electrode arrays 129 are made up of a plurality of second electrodes 146. For each of the first electrode arrays 126, there is a corresponding second electrode array 129. Each of the first electrode array 126 is smaller in size than the corresponding second electrode array 129 to account for the fact that the first electrode arrays 126 are moveable. Consequently, even though the first electrode arrays 126 move relative to the respective second electrode arrays 126, there is always substantially similar overlap between the respective pairs of first and second electrode arrays 126 throughout the entire range of motion of the proof mass 119.

Each of the first and second electrodes 143 and 146 comprise rectangular conductors that are disposed adjacent to each other. The distance between a common point in each of the electrodes 143 and 146 for a respective electrode array is called the "pitch" of the electrode array. Although the electrodes 143 and 146 are shown as rectangular conductors, it is understood that conductors of other shapes and sizes may be employed as desired in connection with the principles described herein. Also, electrodes may be disposed in configurations other than in rectangular arrays as depicted. For example, the electrodes may be disposed in a circular array for use in detecting angular acceleration and displacement as can be appreciated.

Figure 3:
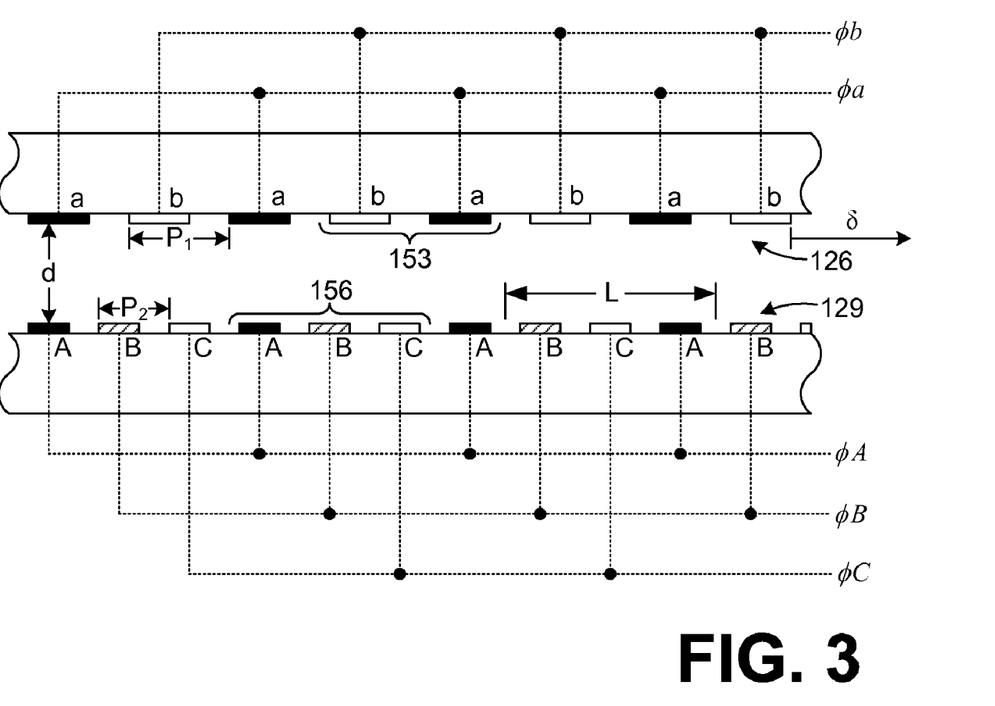
FIG. 3 is a is a schematic of the electrical coupling between corresponding electrodes in the sensor of FIG. 1 according to an embodiment of the present invention.

Turning then to FIG. 3, shown is a side view of portions of the first and second electrode arrays 26 and 129. In addition, the electrical connections between respective ones of the electrodes 143 and 146 in the respective electrode arrays 126 or 129 are depicted. In view of the electrical connections, the first electrode array 126 includes a plurality of first patterns 153 of the electrodes 143. Each pattern 153 includes two of the electrodes 143. Each electrode 143 within each pattern 153 corresponds with other electrodes 143 in other patterns 153 that occupy the same position in their respective patterns 143. That is to say, a first one of the electrodes 143 within a first one of the first patterns 153 corresponds to a second one of the electrodes 143 in a second one of the first patterns 143 when both such electrodes 143 occupy the same location within their respective patterns 153. The corresponding electrodes 143 in each of the patterns 153 are electrically coupled to each other. Also, the first patterns 153 are interdigitated with respect to each other within the first electrode array 126.

The second electrode array 129 comprises a plurality of second patterns 156 of the electrodes 146. The second patterns 156 are interdigitated within the second electrode array 129. Each of the second patterns 156 comprises at least three second electrodes 146. The corresponding ones of the second electrodes 146 in each of the second patterns 156 are coupled in common.

Each of the electrodes 143 and 146 are evenly spaced within the first and second electrode arrays 126 and 129. In this respect, the first electrode array 126 has a pitch $P_1$, where the pitch $P_1$ is the distance between a point on a given electrode within the first electrode array 126 and the same point on the next an adjacent electrode. Similarly, the second electrode array 129 has a pitch $P_2$. In the context of one embodiment of the sensor 100, the first and second electrode arrays 126 and 129 have a group length L, where $L=2P_1=3P_2$.

According to an embodiment of the present invention, the pitches $P_1$ and $P_2$ of the first and second electrode arrays 126 and 129 are specified such that a ratio of a pitch $P_1$ of the first electrode array 126 to the pitch $P_2$ of the second electrode array 129 is substantially equal to 1.5. This configuration results in output signals or phases from second electrode array 129 that are separated in phase by 120 degrees as will be discussed.

The commonly coupled electrodes 143 of the first electrode array 126 form either the first phase $\theta_a$ or a second phase $\theta_b$. Similarly, the electrodes 146 that are commonly coupled form phases $\theta_A$, $\theta_B$, and $\theta_C$, as shown.

Figure 4:
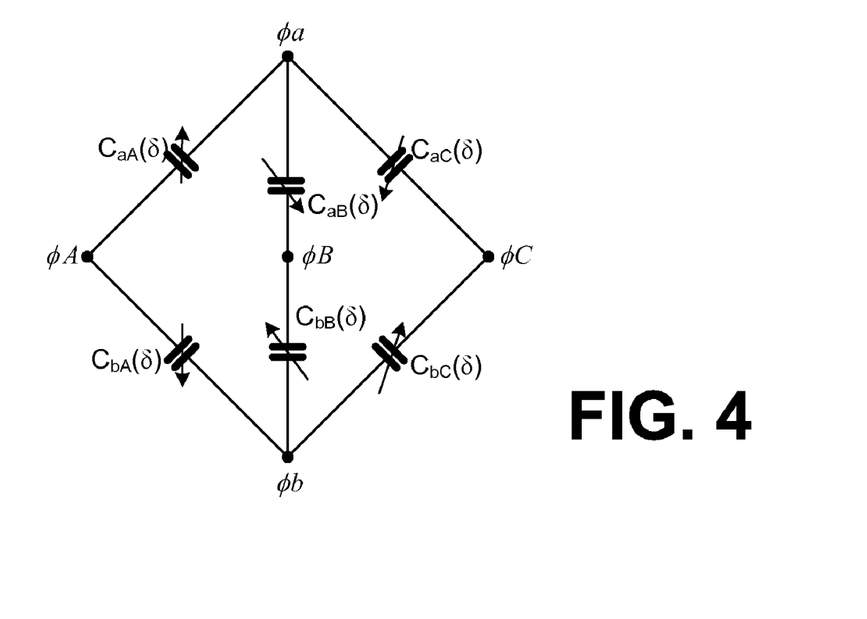
FIG. 4 is a schematic of an equivalent circuit showing the cross-capacitances between first and second electrode arrays in the sensor of FIG. 1 according to an embodiment of the present invention.

Referring next to FIG. 4, shown is an equivalent circuit that shows the cross-capacitance terms between the first electrode array 126 and the second electrode array 129 as a function of displacement δ of the first electrode array 126 relative to the second electrode array 129. Although not shown, it is understood that other constant and variable capacitances associated with the first and second electrode arrays 126 and 129 including parasitic capacitances may exist that are not taken into account in the schematic of FIG. 4. While the capacitances shown in FIG. 4 vary with the relative position of the two electrode arrays 126 and 129, it is understood that the parasitic capacitances that are not shown may not experience significant variation or may be constant.

Figure 5:
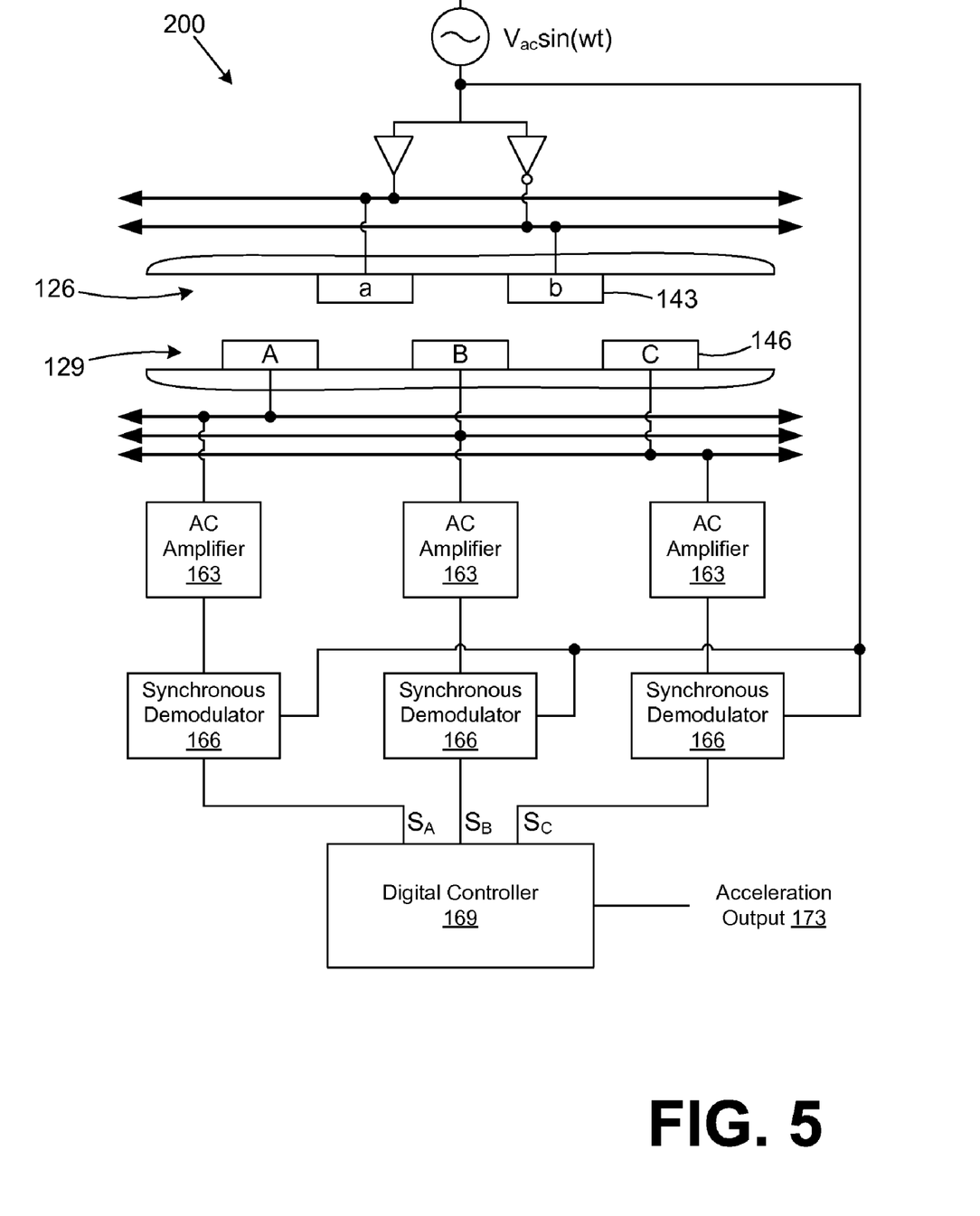
FIG. 5 is a schematic of a sensor as depicted in FIG. 1 embodied in an open circuit configuration to generate an acceleration output according to an embodiment of the present invention.

Referring next to FIG. 5, shown is a schematic of a three phase sensor 200 that provides one example of the sensor 100 (FIG. 1) according to an embodiment of the present invention. The three phase sensor 200 includes the first electrode array 126 (two electrodes depicted) that illustrates a single pattern 153 (FIG. 3). In addition, the three phase sensor 200 includes the second electrode array 129 (three electrodes depicted) that illustrates a single pattern 156 (FIG. 3). The sensor 200 includes a voltage source $V_{ac} \sin(\omega t)$ that is applied to the electrodes 143 of the first electrode array 126. The voltage source $V_{ac} \sin(\omega t)$ is directly applied to a first one of the commonly coupled electrodes 143 of the first electrode array 126. The voltage source $V_{ac} \sin(\omega t)$ is also inverted (i.e., shifted in phase by 180°) and applied to the second one of the commonly coupled electrodes 143 as shown.

Each of the commonly coupled electrodes 146 in the second electrode array 129 are coupled to a respective one of three AC amplifiers 163. The outputs of each of the AC amplifiers 163 is coupled to an input of a respective synchronous demodulator 166. The outputs of each of the synchronous demodulators 166 are each applied to a digital controller 169. The digital controller 169 generates an acceleration output 173.

The three phase sensor 200 is configured to generate three signal outputs $S_A$, $S_B$, and $S_C$ based upon the phase-to-phase capacitance between the first electrode array 126 and the second electrode array 129. The three signal outputs correspond to the three commonly coupled electrodes 146 of the patterns 156 of the second electrode array 129. The frequency of the AC voltage source $V_{ac} \sin(\omega t)$ is specified so as to be substantially higher than either a closed loop bandwidth or any system mechanical responses. The cross-capacitance between the first electrode array 126 and the second electrode array 129 results in signals at the second electrodes 146 that are applied to the respective AC amplifiers 163. Each of the AC amplifiers 163 includes an input capacitor that isolates the AC amplifiers 163 from DC voltage.

The outputs of each of the AC amplifiers 163 are applied as inputs to corresponding synchronous demodulators 166. Under conditions of AC excitation, the amplitude of the sinusoidal signals entering the synchronous demodulators 166 vary with the changes in capacitance as the electrode arrays 126 and 129 move relative to each other. The synchronous demodulators 166 each produce a signal that is proportional to the amplitude of the sinusoidal signals and therefore is also proportional to the change in capacitance. This amplitude modulation signal is not subject to the noise sources near DC, thereby providing a substantially improved signal-to-noise ratio.

In order to obtain a maximum change in the cross-capacitances per change in position (dC/dx), the ratio of the pitch of the first electrode array 126 to the gap d between the first and second electrode arrays 126 and 129 is specified to be substantially equal to 1.6, or stated another way, $P_1/d \approx 1.6$. In this regime, the variation in the cross-capacitance may be adequately represented by a single component Fourier expansion with a period equal to the group length L. However, it should be understood that other values may be employed for the ratio of the pitch of the first electrode array to the gap d. The differential cross-capacitance variation normalized by the total overlap area between electrode arrays 126 and 129 for the three phases A, B, and C may be represented by:

$$C_A(d,\delta,L)=C_{aA}(d,\delta,L)-C_{bA}(d,\delta,L)=C_s(d,L)\cos(2\pi\delta/L-2\pi/3), \quad (1)$$

$$C_B(d,\delta,L)=C_{aB}(d,\delta,L)-C_{bB}(d,\delta,L)=C_s(d,L)\cos(2\pi\delta/L), \text{ and} \quad (2)$$

$$C_C(d,\delta,L)=C_{aC}(d,\delta,L)-C_{bC}(d,\delta,L)=C_s(d,L)\cos(2\pi\delta/L+2\pi/3), \quad (3)$$

where $C_s(d,L)$ is the amplitude of the area normalized capacitance cycle that depends upon the spacing of the electrodes, the gap d, and the group length L.

Since the group length L and the area of the electrode arrays 126 and 129 are fixed for a given sensor 200, the sensor specific function $C_s(d)$ may be determined using modeling and checked by measurement. The above equations may be rewritten in terms of a position phase angle $\theta_p = 2\pi\delta/L$. As such, the signal outputs $S_A$, $S_B$, and $S_C$ may be written as:

$$S_A(d,\theta_p)=V_{Aoff}+V_{ac}G_A C_s(d)\cos(\theta_p-2\pi/3), \quad (4)$$

$$S_B(d,\theta_p)=V_{Boff}+V_{ac}G_B C_s(d)\cos(\theta_p), \text{ and} \quad (5)$$

$$S_C(d,\theta_p)=V_{Coff}+V_{ac}G_C C_s(d)\cos(\theta_p+2\pi/3), \quad (6)$$

where $G_A$, $G_B$, and $G_C$ are the gains of the respective AC amplifiers 163; $V_{Aoff}$, $V_{Boff}$, and $V_{Coff}$ are the combined amplifier and demodulator offsets; and $V_{ac}$ is the magnitude of the source signal.

Differences in gains are minimized or eliminated by switching a calibration capacitor into each channel, resulting in a single calibrated AC amplifier gain $G_D$. By calibrating the demodulator offsets $V_{Aoff}$, $V_{Boff}$, and $V_{Coff}$, they may be removed where $d=d_o$. The gap $d_o$ is the gap d at startup of the circuit determined during a controlled calibration procedure at time of manufacture. The signal outputs $S_A$, $S_B$, and $S_C$ may be written as $$S_A(d_o,\theta_p)=V_{ac}G_D C_s(d_o)\cos(\theta_p-2\pi/3), \quad (7)$$

$$S_B(d_o,\theta_p)=V_{ac}G_D C_s(d_o)\cos(\theta_p), \text{ and} \quad (8)$$

$$S_C(d_o,\theta_p)=V_{ac}G_D C_s(d_o)\cos(\theta_p+2\pi/3). \quad (9)$$

The squared sum of these three signal outputs $S_A$, $S_B$, and $S_C$ may be expressed as:

$$S_T^2(d_o,\theta_p)=(S_A(d,\theta_p))^2+S_B(d,\theta_p))^2+S_C(d,\theta_p)^2) \quad (10)$$

which may be simplified to:

$$S_T^2(d_o,\theta_p)=[V_{ac}G_D C_s(d)]^2((\cos(\theta_p-2\pi/3))^2+(\cos(\theta_p))^2+(\cos(\theta_p+2\pi/3))^2). \quad (11)$$

Since the equation:

$$(\cos(\theta_p-2\pi/3))^2+(\cos(\theta_p))^2+(\cos(\theta_p+2\pi/3))^2=1.5 \quad (12)$$

when phases are separated by 120 degrees, then $$S_T^2(d) = 1.5 \times (V_{ac}G_d C_s(d))^2 \text{ or } V_{ac}G_d C_s(d) = \sqrt{\frac{S_T^2(d)}{1.5}}. \quad (13)$$

Dividing through, we have:

$$S_{Aout} = 0.816 \times \frac{S_A(d, \theta_p)}{\sqrt{S_T^2(d)}} = \cos(\theta_p - 2\pi/3), \quad (14)$$

$$S_{Bout} = 0.816 \times \frac{S_B(d, \theta_p)}{\sqrt{S_T^2(d)}} = \cos(\theta_p), \text{ and} \quad (15)$$

$$S_{Cout} = 0.816 \times \frac{S_C(d, \theta_p)}{\sqrt{S_T^2(d)}} = \cos(\theta_p + 2\pi/3). \quad (16)$$

First, we note that by specifying the ratio $P_1/d \approx 1.6$, we create the situation where the cross-capacitances, and therefore the signal outputs vary according to sinusoid as represented by the cosine terms in equations 1, 2, and 3. Also, by virtue of the fact that the phases are 120 degrees from each other, the equation $(\cos(\theta_p - 2\pi/3))^2 + (\cos(\theta_p))^2 + (\cos(\theta_p + 2\pi/3))^2 = 1.5$ is true. Consequently, we can make the substitutions of equation 13 into equations 7, 8, and 9 to get equations 14, 15, and 16. As such, the effect of the gap d is substantially canceled out and does not affect the signal outputs $S_A$, $S_B$, and $S_C$. As such, by virtue of the foregoing specifications, we are able to normalize the signal outputs $S_A$, $S_B$, and $S_C$ to substantially minimize or eliminate any effect that a change in the gap d that might occur do to acceleration in a direction orthogonal to the plane in which the second electrode array 129 lies. Thus, the signal outputs $S_A$, $S_B$, and $S_C$ are normalized to correct for noise resulting from variation in the gap d between the first and second electrode arrays 126 and 129 resulting either from orthogonal inertial input or from variation in gap d due to other non-inertial sources such as thermally-induced structural distortions.

Figure 6:
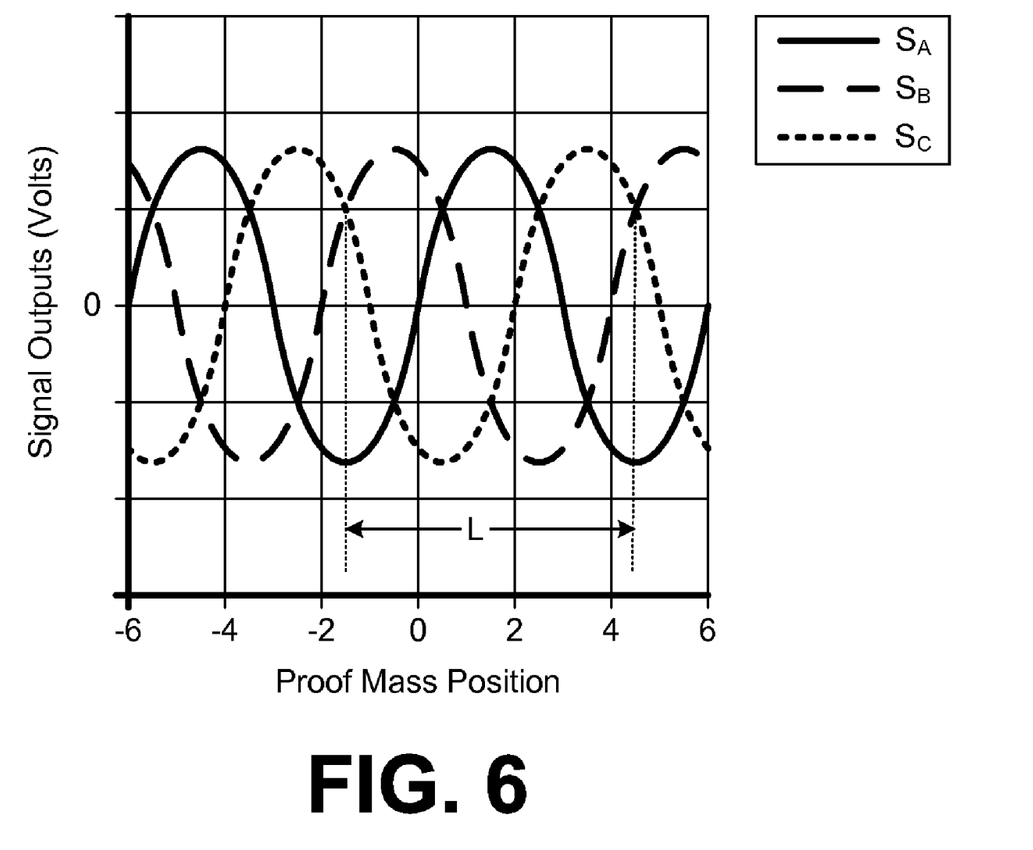
FIG. 6 is a drawing of a graph that illustrates a signal outputs that indicate a position of a proof mass of the sensor of FIG. 5 according to an embodiment of the present invention.

Referring next to FIG. 6, shown is a graph of the signal outputs $S_A$, $S_B$, and $S_C$ as a function of position of the proof mass 119. The signal outputs $S_A$, $S_B$, and $S_C$ are proportional to the differential cross-capacitances $C_{aA}(\delta) - C_{bA}(\delta)$, $C_{aB}(\delta) - C_{bB}(\delta)$, and $C_{aC}(\delta) - C_{bC}(\delta)$. According to one embodiment, the cross-capacitances $C_{aA}(\delta) - C_{bA}(\delta)$, $C_{aB}(\delta) - C_{bB}(\delta)$, and $C_{aC}(\delta) - C_{bC}(\delta)$ and corresponding signal outputs $S_A$, $S_B$, and $S_C$ are substantially sinusoidal. This holds true when the ratio of the pitch $P_1$ of the first electrode array 126 to the gap d between the first and second electrode arrays 126 and 129 is properly specified under the circumstances. In one embodiment, the cross-capacitances $C_{aA}(\delta) - C_{bA}(\delta)$, $C_{aB}(\delta) - C_{bB}(\delta))$, and $C_{aC}(\delta)) - C_{bC}(\delta)$ and corresponding signal outputs $S_A$, $S_B$, and $S_C$ are substantially sinusoidal when the ratio $P_1/d \approx 1.6$.

The signal outputs $S_A$, $S_B$, and $S_C$ are normalized to correct for variation in the gap d. The three signal outputs $S_A$, $S_B$, and $S_C$ are required in order to determine to which half of the sinusoidal cycle each signal corresponds. Using this information, the sinusoidal outputs $S_A$, $S_B$, and $S_C$ each provide an independent measure of the displacement of the proof mass 119. However, it should be noted that the variation in each of the signals $S_A$, $S_B$, and $S_C$ is minimized when each of the signal outputs approaches a zero slope at a maximum or a minimum of the sinusoid. It is desirable for an accurate representation of a position of the proof mass 119 that the signal outputs $S_A$, $S_B$, and $S_C$ be experiencing a maximum change for a corresponding change in position of the proof mass 119. Such is the case, for example, when the curves of the signal outputs $S_A$, $S_B$, and $S_C$ experience substantially the maximum slope between the positive and negative peaks.

As a consequence, according to one embodiment, the digital controller 169 is configured to calculate a weighted average of the magnitude of the displacement of the proof mass 119 relative to the support structure from the initial magnitudes determined from each respective one of the signal outputs $S_A$, $S_B$, and $S_C$. In this respect, each of the values represented by each corresponding signal output $S_A$, $S_B$, or $S_C$ is multiplied by a corresponding weight. The weights are determined from the curves of the signal outputs $S_A$, $S_B$, or $S_C$. In particular, the slope of the curve is taken for the value at the point on the respective sinusoid represented by the respective signal output $S_A$, $S_B$, or $S_C$. These slopes are used to calculate a weighted average of the position of the proof mass 119 to increase accuracy and prevent inaccurate signal outputs $S_A$, $S_B$, or $S_C$ near the zero slopes of the sinusoids from significantly adversely affecting the position output. The slopes may be obtained for each value represented by the signal outputs $S_A$, $S_B$, or $S_C$ using a lookup table or they may be calculated as can be appreciated.

By virtue of the fact that the signal outputs $S_A$, $S_B$, or $S_C$ are available, the digital controller 169 can track the movement of the proof mass 119 through multiple cycles of any one of the signal outputs $S_A$, $S_B$, or $S_C$. In particular, where any one of the signal outputs $S_A$, $S_B$, or $S_C$ approaches a zero slope (a negative or positive peak in the sinusoid), the slopes of the other two signal outputs will be either significantly negative or positive. As a consequence, the movement of the proof mass 119 may be tracked across an entire cycle of any one of the signal outputs $S_A$, $S_B$, or $S_C$. In addition, the digital controller 169 may be configured to track the movement of the proof mass 119 through several cycles of any one of the signal outputs $S_A$, $S_B$, or $S_C$. In particular, when one of the signal outputs $S_A$, $S_B$, or $S_C$ is at or near a zero slope, the slopes of the other two signal outputs $S_A$, $S_B$, or $S_C$ provide positional information by which the movement of the proof mass 119 may be tracked across multiple cycles. Consequently, the digital controller 169 may be configured to track the movement of the proof mass 119 at distances greater than a single cycle of variation of any one of the signal outputs $S_A$, $S_B$, or $S_C$ or distances greater than the group length L. Note that the digital sample rate should be adequate to insure that movement between samples is always less than one cycle.

The sensor 200 maybe employed to detect acceleration by virtue of movement of the proof mass 119. In particular, when the sensor 200 experiences acceleration, the proof mass 119 will be displaced relative to a resting point. Thus, the acceleration may be determined based upon the displacement of the proof mass 119. The displacement of the proof mass 119 during a given rate of acceleration depends upon the degree of compliance of the compliant coupling attaching the proof mass 119 to the support structure. That is to say, the compliance of the flexural suspension elements 123 determines how much force is necessary to displace the proof mass 119 by a given amount. Consequently, a range of acceleration that may be determined or sensed by the sensor 200 depends upon a degree of compliance of the compliant coupling.

Figure 7:
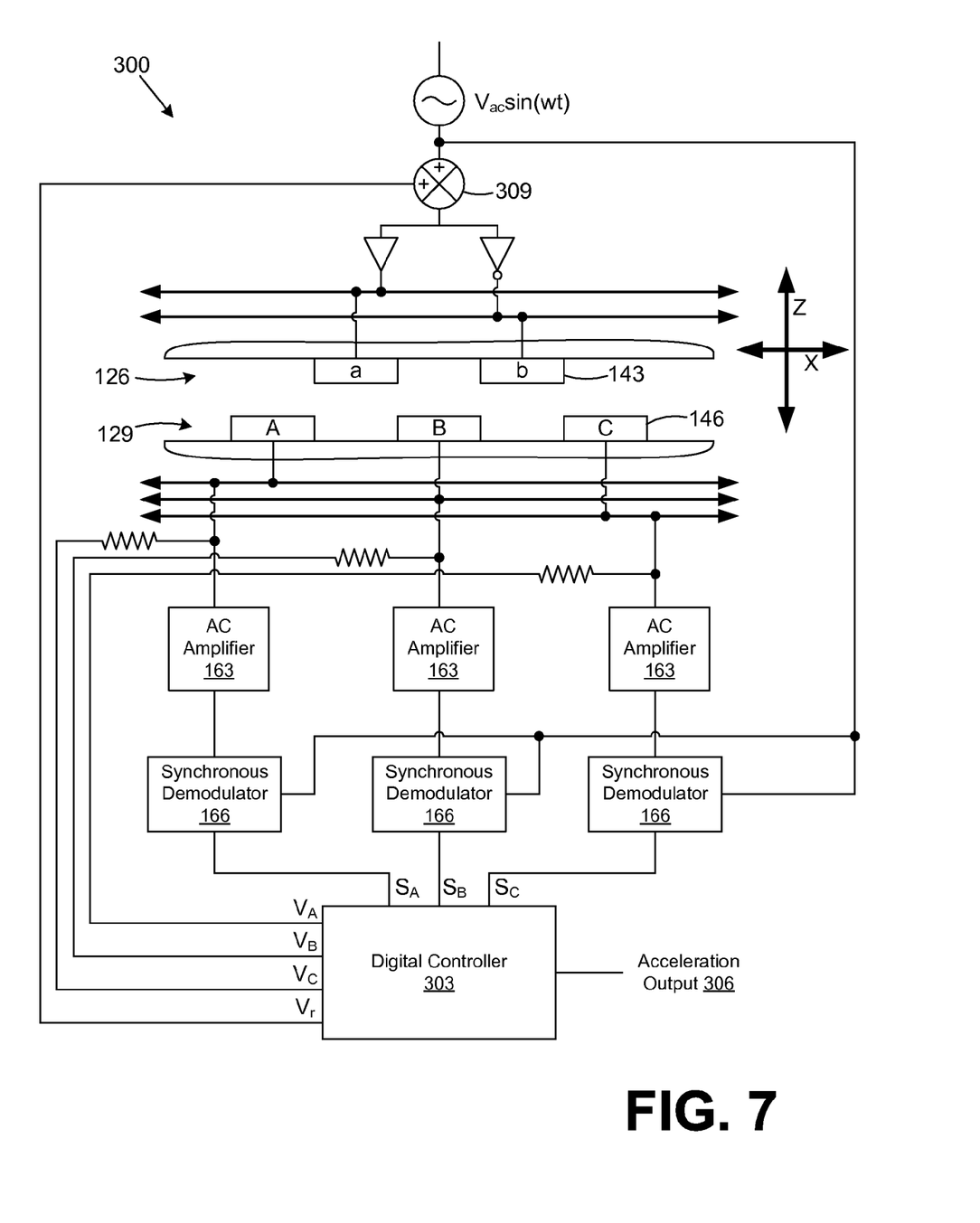
FIG. 7 is a schematic of a sensor as depicted in FIG. 1 embodied in a closed circuit configuration to generate an acceleration output according to an embodiment of the present invention.

Referring next to FIG. 7, shown is a three phase sensor 300 according to an embodiment of the present invention. The three phase sensor 300 employs a closed loop configuration circuit that provides output signals that indicate a position of the proof mass 119 and, at the same time, generates actuation signals that force the proof mass 119 to maintain a predefined position. The generation of the signal outputs $S_A$, $S_B$, and $S_C$ in the three phase sensor 300 is performed as discussed above with respect to the three phase sensor 200 (FIG. 5) and, consequently, is not discussed herein in detail.

However, in addition to the circuitry discussed above with respect to the three phase sensor 200, the three phase sensor 300 includes a digital controller 303 that generates the acceleration output 306. The digital controller 303 also generates actuation signals $V_A$, $V_B$, $V_C$, and $V_r$. The actuation signals $V_A$, $V_B$, and $V_C$ are applied to the electrodes 146, respectively, through resistors R. The actuation signals $V_A$, $V_B$, and $V_C$ are DC voltages that are isolated from the AC amplifiers 163 by virtue of input capacitors in the AC amplifiers 163. The actuation signal $V_r$ is applied to a summing junction 309 and is added to the source signal $V_{ac} \sin(\omega t)$.

The actuation signals $V_A$, $V_B$, $V_C$, and $V_r$ are employed to force the proof mass 119 to stay in a predefined position when the sensor 300 experiences acceleration. Specifically, when the sensor 300 experiences acceleration, the proof mass 119 will naturally try to move due to the force applied. The signal outputs $S_A$, $S_B$, and $S_C$ will indicate that the proof mass 119 is moving to the position information provided as described above. In response, the digital controller 303 responds by generating the actuation signals $V_A$, $V_B$, $V_C$, and $V_r$ to apply a force to the proof mass 119 to counteract the force due to acceleration, thereby maintaining the proof mass 119 in the predefined position. In this sense, the actuation signals $V_A$, $V_B$, $V_C$, and $V_r$ may be viewed as feedback signals generated in response to the signal outputs $S_A$, $S_B$, and $S_C$.

The digital controller 303 is configured to generate the actuation signals $V_A$, $V_B$, $V_C$, and $V_r$ in a manner that minimizes or eliminates any actuation force in a direction orthogonal to the plane in which the second electrode array 129 lies. To explain further, a force may be generated along both an X axis (X force) and a Z axis. The digital controller 303 is configured to generate the actuation signals $V_A$, $V_B$, $V_C$, and $V_r$ so as to result in the creation of a needed force in the position or negative X direction so as to maintain the proof mass 119 in a predefined position. The force in the X direction is created in a manner such that little or no force is generated in the positive or negative Z direction at the same time. By doing this, the digital controller 303 is able to maintain the proof mass 119 in a predefined position despite the physical acceleration experienced by the sensor 300 without creating unwanted force in the positive or negative Z direction that might cause an unwanted change in the gap d.

According to various embodiments, the compliant coupling in the form of the flexural suspension elements 123 (FIG. 1) as employed in the sensor 300 may be constructed such that the degree of compliance is maximized such that the proof mass 119 is easily moved with very little force. In one embodiment, the predefined position at which the proof mass 119 is maintained by the sensor 300 may comprise a rest position at which the flexural suspension elements 123 are in a state of equilibrium. Alternatively, the proof mass 119 may be maintained in some other position.

If the degree of compliance of the flexural suspension elements 123 is maximized, then the primary component of force that maintains the proof mass 119 in any predefined position is that which is generated based upon the actuation signals $V_A$, $V_B$, $V_C$, and $V_r$. Thus, if we know the amount of force necessary to overcome any physical resistance to movement due to the flexural suspension elements 123 (even if minimized), then the actual acceleration of the sensor 300 may be determined based upon the force generated by the actuation signals $V_A$, $V_B$, $V_C$, and $V_r$. This may be calculated from the magnitude of the actuation signals $V_A$, $V_B$, $V_C$, and $V_r$ or may be obtained using a lookup table, etc.

It should also be understood that the sensors 300 have a range of operation and it may be possible that the acceleration experienced by the sensor 300 might apply a force to the proof mass 119 that would be too great for the force generated by the actuation signals $V_A$, $V_B$, $V_C$, and $V_r$ to overcome. As such, the actuation signals $V_A$, $V_B$, $V_C$, and $V_r$ would not be able to maintain the proof mass 119 in a predefined location. This is a situation where the acceleration is beyond the window of operation of the sensor 300 as can be appreciated. The actual window of operation of the sensor 300 depends upon the range of force that can be generated by the actuation signals $V_A$, $V_B$, $V_C$, and $V_r$ as well as the stiffness of the compliant couplings such as the flexural suspension elements 123 as can be appreciated.

Figure 8:
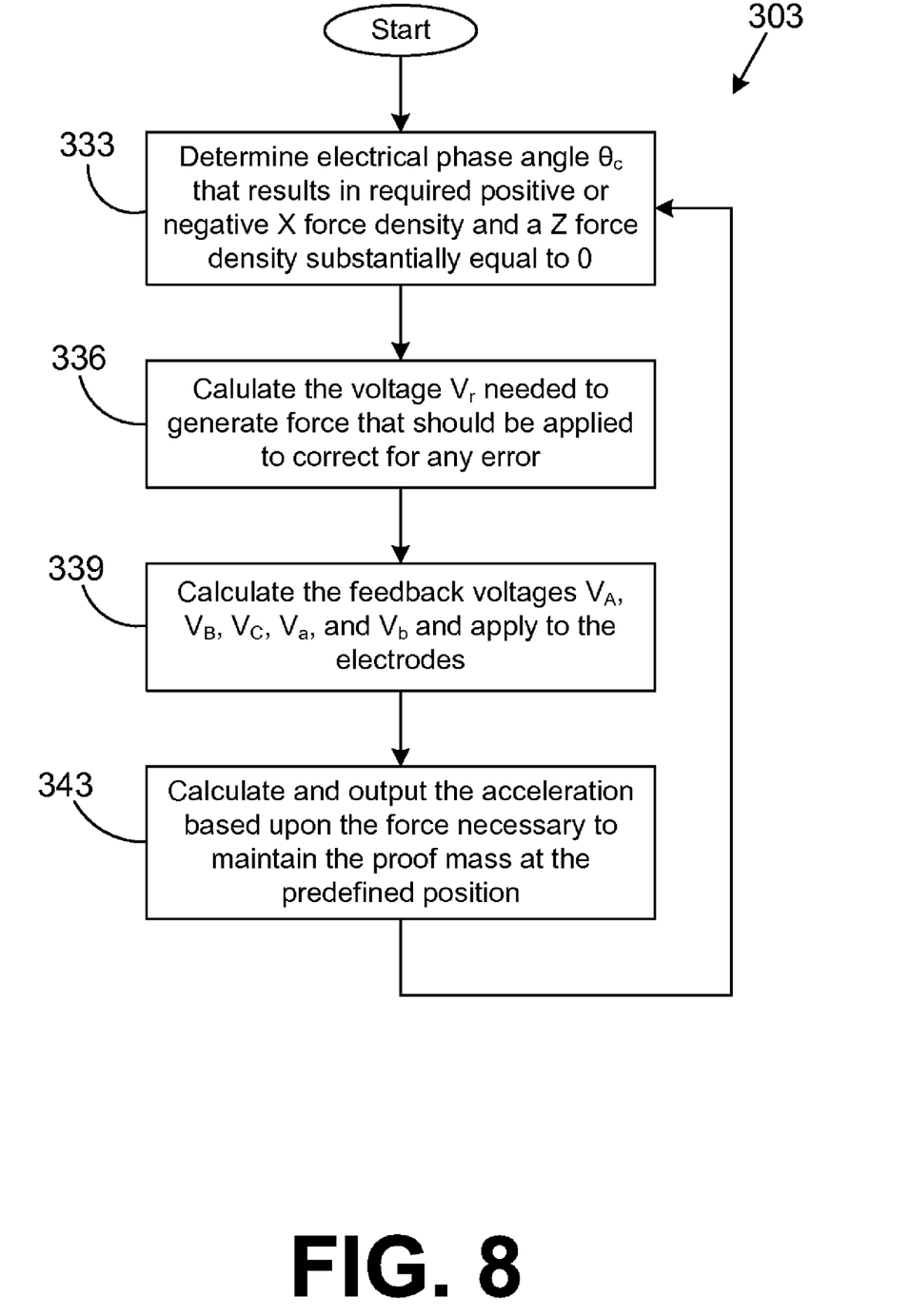
FIG. 8 is a flow chart that illustrates one example of a portion of the operation of the digital controller employed in the sensor of FIG. 7 schematic of a sensor as depicted in FIG. 1 employed in an open circuit configuration to generate an acceleration output according to an embodiment of the present invention.

Referring next to FIG. 8, shown is a flow chart that provides one example of the operation of a portion of the digital controller 303 according to an embodiment of the present invention. Alternatively, the flow chart of FIG. 8 may be viewed as depicting steps of an example of a method implemented in the digital controller 303 to determining the actuation signals $V_A$, $V_B$, $V_C$, and $V_r$ that should be generated at any given time in order to ensure that the proof mass 119 remains in the predefined position. The functionality of the digital controller 303 as depicted by the example flow chart of FIG. 8 may be implemented in terms of software, hardware, or a combination of software and hardware as can be appreciated. The routine depicted in FIG. 8 illustrates functions that may be performed, for example, during each servo update cycle.

To begin, in box 333, the digital controller 303 determines an electrical phase angle $\theta_c$ that results in a desired positive or negative X force density and a Z force density that is substantially or exactly equal to zero. In order to do so, the X position of the proof mass 119 is determined. Note that the Z position of the proof mass 119 is assumed to be constant with a uniform gap d as described above. The digital controller 303 determines the required X restoring force making use of any necessary digital filters. Corrections to the force density coefficients based on spacing between the first and second electrode arrays 126 and 129 are made. The required force vector angle, $\phi_f$, and the position angle, $\theta_p$, are used to determine the required electrical phase angle $\theta_c$. Next, in box 336, a value for the actuation signal $V_r$ is calculated in order generate force that is to be applied to correct for any error. The actuation signal $V_r$ may be calculated using the following equation:

$$F_x = -4AV_r^2 f_x(d,L) \sin(\theta_c + \theta_p) \quad (17)$$

where $f_x(d,L)$ comprises force density coefficients determined from modeling or measurement. Thereafter, in box 339 the actuation signals $V_A$, $V_B$, and $V_C$ are calculated using the following equations:

$$V_A = V_o - V_r \cos(\theta_c - 2\pi/3), \quad (18)$$

$$V_B = V_o - V_r \cos(\theta_c), \text{ and} \quad (19)$$

$$V_C = V_o - V_r \cos(\theta_c + 2\pi/3), \quad (20)$$

Thereafter, the actuation signals $V_A$, $V_B$, $V_C$, and $V_r$ as newly calculated are applied to the electrodes of the first and second electrode arrays 126 and 129. Then, in box 343, the digital controller 303 determines a new value for the acceleration output 306 based on the actuation signals $V_A$, $V_B$, $V_C$, and $V_r$ applied to the first and second electrode arrays 126 and 129. Then, the digital controller 303 reverts back to box 333.

Although in one embodiment the digital controller 303 may be embodied in software or code executed by general purpose hardware such as a digital processor as discussed above, as an alternative the same may also be embodied in dedicated hardware or a combination of software/general purpose hardware and dedicated hardware. If embodied in dedicated hardware, the digital controller 303 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 8 shows the architecture, functionality, and operation of an implementation of the digital controller 303. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the digital controller 303 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the digital controller 303 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In addition, the systems and methods described above for quantifying capacitance variation are termed "analog" approaches and operate in the frequency domain. However, switch-capacitor techniques applied in the time domain typically, referred to as "digital" approaches may also be employed. In particular, rather than use the analog source voltage $V_{ac}$ sin($\omega$t), digital excitation signals may be employed as can be appreciated.

It should be emphasized that the above-described embodiments of the present invention represent possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A sensor, comprising:
    a first electrode array disposed on a proof mass;
    a second electrode array disposed on a planar surface of a support structure;
    the proof mass being attached to the support structure via a compliant coupling such that the first electrode array is positioned substantially parallel to and faces the second electrode array, where the proof mass is capable of displacement relative to the support structure, the displacement of the proof mass being in a direction substantially parallel to the second electrode array;
    the first electrode array comprising a plurality of first electrode patterns, the first electrode patterns being interdigitated, each of the first electrode patterns comprising at least two separate first electrodes, where corresponding ones of first electrodes in the first electrode patterns are coupled in common and configured to connect to a separate phase of a sinusoidal supply; and
    the second electrode array comprising a plurality of second electrode patterns, the second electrode patterns being interdigitated, each of second electrode patterns comprising at least three separate second electrodes, where corresponding ones of the second electrodes in the second electrode patterns are coupled in common.

2. The sensor of claim 1, where a ratio of a pitch of the first electrode array to a pitch of the second electrode array is substantially equal to 1.5.

3. The sensor of claim 1, further comprising circuitry to generate at least three signal outputs based upon a phase-to-phase cross capacitance between the first electrode array and the second electrode array, where the at least three signal outputs correspond to the respective at least three second electrodes in the second electrode patterns.

4. The sensor of claim 3, further comprising a decoder that determines a magnitude of the displacement of the proof mass relative to the support structure from the at least three signal outputs.

5. The sensor of claim 4, wherein the decoder is further configured to determine the magnitude of the displacement of the proof mass relative to the support structure as a weighted average of initial magnitudes determined from each respective one of the at least three signal outputs.

6. The sensor of claim 3, wherein the at least three signal outputs are normalized to correct for noise resulting from variation in a gap between the first and second electrode arrays.

7. The sensor of claim 3, wherein a ratio of a pitch of the first electrode array to a gap between the first and second electrode arrays is substantially equal to 1.6.

8. The sensor of claim 3, wherein a ratio of a pitch of the first electrode array to a gap between the first and second electrode arrays is specified so that each of the at least three signal outputs are substantially sinusoidal.

9. The sensor of claim 8, wherein the at least three signal outputs vary substantially sinusoidally in response to the displacement of the proof mass relative to the support structure, and further comprising a decoder that tracks the displacement of the proof mass through a plurality of cycles of the signal outputs.

10. The sensor of claim 3, further comprising a decoder that determines an acceleration of the support structure from the at least three signal outputs.

11. The sensor of claim 10, wherein a range of the acceleration that may be determined substantially depends upon a degree of compliance of the compliant coupling.

12. The sensor of claim 10, wherein the acceleration is determined based upon a plurality of actuation signals generated by the decoder that are applied to the first and second electrode arrays, wherein the actuation signals are employed to maintain the proof mass in a predefined position relative to the support structure.

13. The sensor of claim 12, wherein a range of the acceleration that may be determined substantially depends upon both a degree of compliance of the compliant coupling and a maximum magnitude of the actuation signals.

14. A method for sensing acceleration using a sensor having a first electrode array disposed on a proof mass and a second electrode array disposed on a planar surface of a support structure, the proof mass being attached to the support structure via a compliant coupling such that the first electrode array is positioned substantially parallel to and faces the second electrode array, where the proof mass is capable of displacement relative to the support structure, the displacement of the proof mass being in a direction substantially parallel to the second electrode array, the method comprising the steps of:

applying an input signal to a first electrode array, the first electrode array comprising a plurality of first patterns of electrodes, the first patterns being interdigitated, each of the first patterns comprising of at least two separate first electrodes, where corresponding ones of first electrodes in the first patterns are coupled in common to the input signal; and generating at least three signal outputs based upon a phase-to-phase cross capacitance between the first electrode array and the second electrode array, the second electrode array comprising a plurality of second patterns of electrodes, the second patterns being interdigitated, each of second patterns comprising at least three separate second electrodes, where corresponding ones of the second electrodes in the second patterns are coupled in common, where the at least three signal outputs correspond to the respective at least three second electrodes in the second patterns.

15. The method of claim 14, where a ratio of a pitch of the first electrode array to a pitch of the second electrode array is substantially equal to 1.5.

16. The method of claim 14, further comprising the step of determining a magnitude of the displacement of the proof mass relative to the support structure from the at least three signal outputs.

17. The method of claim 16, further comprising the step of determining the magnitude of the displacement of the proof mass relative to the support structure as a weighted average of initial magnitudes determined from each respective one of the at least three signal outputs.

18. The method of claim 14, further comprising the step of normalizing the at least three signal outputs to correct for noise resulting from variation in a gap between the first and second electrode arrays.

19. The method of claim 14, further comprising the step of determining an acceleration of the support structure from the at least three signal outputs.

20. A sensor, comprising:
a first electrode array disposed on a proof mass;
a second electrode array disposed on a planar surface of a support structure;
the proof mass being attached to the support structure via a compliant coupling such that the first electrode array is positioned substantially parallel to and faces the second electrode array, where the proof mass is capable of displacement relative to the support structure, the displacement of the proof mass being in a direction substantially parallel to the second electrode array;
the first electrode array comprising a plurality of first electrode patterns, the first electrode patterns being interdigitated, each of the first electrode patterns comprising of at least two separate first electrodes, where corresponding ones of first electrodes in the first electrode patterns are coupled in common and configured to connect to a separate phase of a sinusoidal supply;
the second electrode array comprising a plurality of second electrode patterns, the second electrode patterns being interdigitated, each of second electrode patterns comprising at least three separate second electrodes, where corresponding ones of the second electrodes in the second electrode patterns are coupled in common; and
means for generating at least three signal outputs based upon a phase-to-phase cross capacitance between the first electrode array and the second electrode array, where the at least three signal outputs correspond to the respective at least three second electrodes in the second electrode patterns.

21. The sensor of claim 20, further comprising means for providing a sinusoidal supply.

22. The sensor of claim 20, further comprising means for generating a plurality of actuation signals that are applied to the first and second electrode arrays, wherein the actuation signals are employed to maintain the proof mass in a predefined position relative to the support structure.

* * * * *